(12) United States Patent
Cheng et al.

(10) Patent No.: US 12,547,251 B2
(45) Date of Patent: Feb. 10, 2026

(54) VIBRATION UNIT AND HEAD-MOUNTED DISPLAY DEVICE

(71) Applicants: Beijing Zitiao Network Technology Co., Ltd., Beijing (CN); Lemon Inc., Grand Cayman (KY)

(72) Inventors: Erting Cheng, Beijing (CN); Ali Israr, Los Angeles, CA (US); Dehao Zhao, Beijing (CN); Guanqun Zhang, Beijing (CN)

(73) Assignees: Beijing Zitao Network Technology Co., Ltd., Beijing (CN); Lemon Inc., Grand Cayman (KY)

( * ) Notice: Subject to any disclaimer, the term of this patent is extended or adjusted under 35 U.S.C. 154(b) by 0 days.

(21) Appl. No.: 18/914,779

(22) Filed: Oct. 14, 2024

(65) Prior Publication Data

US 2025/0123688 A1 Apr. 17, 2025

(30) Foreign Application Priority Data

Oct. 16, 2023 (CN) .......................... 202311340720.8

(51) Int. Cl.
*G02B 27/01* (2006.01)
*G06F 3/01* (2006.01)
(52) U.S. Cl.
CPC ................... *G06F 3/016* (2013.01)

(58) Field of Classification Search
CPC ... G06F 3/016; G02B 27/017; G02B 27/0149; G02B 27/0176; G02B 2027/0178
See application file for complete search history.

(56) References Cited

U.S. PATENT DOCUMENTS

| 11,740,691 B1* | 8/2023 | Hossain | G06F 3/011 |
| | | | 73/526 |
| 2021/0055559 A1* | 2/2021 | Maric | G02B 27/0176 |
| 2022/0277425 A1* | 9/2022 | Ikenoue | G02B 27/646 |

FOREIGN PATENT DOCUMENTS

| CN | 101595738 A | 12/2009 |
| CN | 103988113 A | 8/2014 |

* cited by examiner

*Primary Examiner* — Rodney Amadiz

(57) ABSTRACT

A vibration unit and a head-mounted display device are provided. The vibration unit includes a vibration motor, a vibration motor mount, a pressing guide, a main frame and an elastic member, the pressing guide including a pressing rod and a pressing plate, and a through hole being provided in either end of the main frame. The vibration motor is in the vibration motor mount fixedly connected to a first surface of the pressing plate; a second surface of the pressing plate abuts against a first end of the pressing rod, and a second end of the pressing rod passes through the through hole and is moveably connected to the main frame; the elastic member is around the pressing rod and is between the pressing plate and the main frame; and the main frame includes a connecting base configured to be connected to the head-mounted display device.

9 Claims, 4 Drawing Sheets

VIBRATION UNIT AND HEAD-MOUNTED DISPLAY DEVICE

CROSS-REFERENCE TO RELATED APPLICATION

This application claims priority to Chinese Patent Application No. 202311340720.8, filed on Oct. 16, 2023, the entire disclosure of which is incorporated herein by reference as part of the present disclosure.

TECHNICAL FIELD

Embodiments of the present disclosure relate to the technical field of extended reality, and in particular to a vibration unit and a head-mounted display device.

BACKGROUND

With the continuous development of extended reality (XR) technology, there are increasing demands for immersive experience. Adding a head haptic feedback can provide immersive experience for a user. However, it also brings some problems, the addition of the head haptic sensation may lead to shaking of a screen of a head-mounted display device. Therefore, how to reduce the resulting shaking of the screen of the head-mounted display device while increasing the immersive head haptic sensation is an urgent problem to be solved.

SUMMARY

This section of the present disclosure is provided to give a brief overview of concepts, which will be described in detail later in the section Detailed Description of Embodiments. This section of the present disclosure is not intended to identify key features or essential features of the claimed technical solution, nor is it intended to limit the scope of the claimed technical solution.

The embodiments of the present application provide a vibration unit and a head-mounted display device.

In a first aspect, an embodiment of the present application provides a vibration unit, including: a vibration motor, a vibration motor mount, a pressing guide, a main frame, and an elastic member, the pressing guide including a pressing rod and a pressing plate, and a through hole being provided in either end of the main frame; wherein the vibration motor is arranged in the vibration motor mount fixedly connected to a first surface of the pressing plate of the pressing guide; a second surface of the pressing plate abuts against a first end of the pressing rod, and a second end of the pressing rod passes through the through hole and is moveably connected to the main frame; the elastic member is arranged around the pressing rod and is located between the pressing plate of the pressing guide and the main frame; and the main frame includes a connecting base configured to be connected to the head-mounted display device.

In some embodiments, the vibration unit further includes: a limiting block; wherein the elastic member is a spring; and the second end of the pressing rod of the pressing guide successively passes through the spring and the through hole, and a tip of the second end of the pressing rod is fixedly connected to the limiting block.

In some embodiments, an insertion hole of the limiting block is an elongated hole.

In some embodiments, the main frame includes a first sub-frame and a second sub-frame that are connected to each other by means of a connecting post, the first sub-frame being configured to be in contact with a human body, and the second sub-frame including the connecting base.

In some embodiments, soft silicone or rubber is provided at an end of the first sub-frame that is in contact with the human body.

In some embodiments, a guide projection is provided at each of two ends of the main frame and is coaxial with the through hole.

In some embodiments, soft silicone or rubber is provided at an end of the vibration motor mount that is in contact with the skin.

In a second aspect, an embodiment of the present application provides a head-mounted display device, including: a head-mounted display device body and a vibration unit of the first aspect; wherein the head-mounted display device body is connected to the connecting base of the vibration unit.

In some embodiments, the head-mounted display device body controls the vibration motor of the vibration unit to vibrate.

BRIEF DESCRIPTION OF DRAWINGS

The foregoing and other features, advantages, and aspects of embodiments of the present disclosure become more apparent with reference to the following specific implementations and in conjunction with the accompanying drawings. Throughout the drawings, the same or similar reference numerals denote the same or similar elements. It should be understood that the accompanying drawings are schematic and that parts and elements are not necessarily drawn to scale.

DETAILED DESCRIPTION

The present application is described in further detail below with reference to the accompanying drawings and embodiments. It should be understood that the specific embodiments described here are merely intended to illustrate the related invention and are not intended to limit the present invention. It should be further noted that, for ease of description, only the parts related to the related invention are shown in the accompanying drawings.

It should be noted that the embodiments of the present application and features of the embodiments may be combined with each other without conflict. The present application will be described in detail below with reference to the accompanying drawings and in conjunction with the embodiments.

Figure 1:
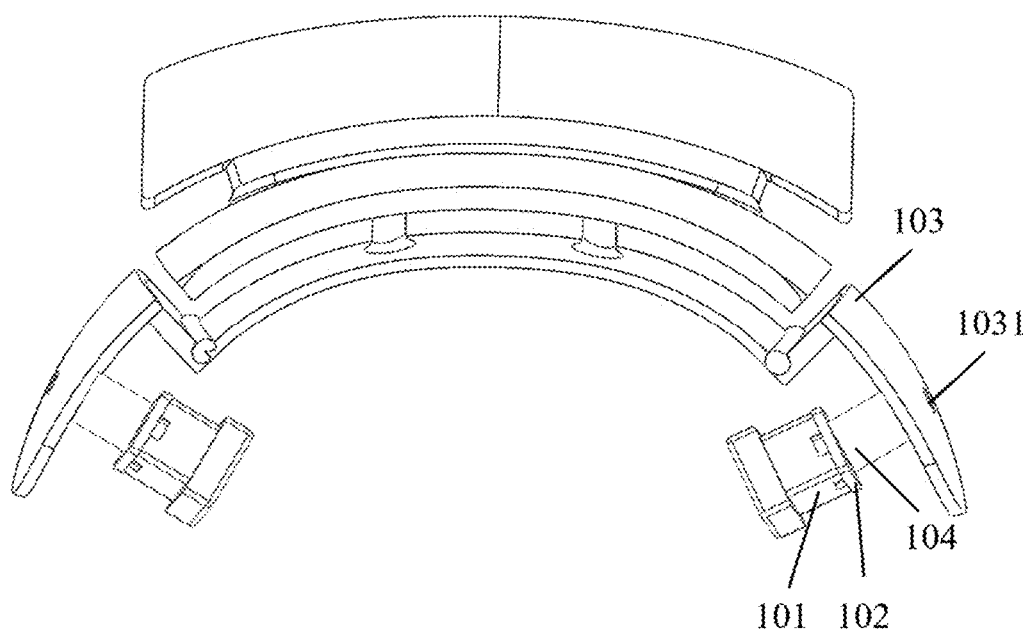
FIG. 1 is a schematic structural diagram of an embodiment of a vibration unit according to the present application.

FIG. 1 shows a schematic structural diagram of an embodiment of a vibration unit according to the present application. As shown in FIG. 1, the vibration unit may include a vibration motor, a vibration motor mount 101, a pressing guide 102, a main frame 103, and an elastic member 104.

Here, the main frame 103 is generally attached to a forehead of a user, and thus the main frame 103 is generally curved in shape. The main frame 103 generally includes a connecting base which is generally configured to be connected to a head-mounted display device, and a through hole as denoted by a reference numeral 1031 is generally provided in either end of the main frame 103.

The head-mounted display device may be an extended reality device, also referred to as an integrated machine, which is itself a computing terminal, and cannot be used without being connected to a host. The head-mounted display device may also be a head mounted display (HMD), also referred to as a head display, which is a 3D virtual reality (VR) graphics display and viewing device, and can be separately connected to a host so as to receive 3DVR graphics signals from the host. The head-mounted display device is used in a head-mounted way, and with the assistance of a spatial tracking locator with three degrees of freedom, a viewer can move freely in a space, for example, walk freely and rotate freely, while viewing a VR output effect, thereby providing a strong immersion.

The pressing guide 102 generally includes a pressing rod and a pressing plate for assisting in upward and downward movements of the elastic member 104. Here, the pressing guide 102 may be a T-shaped pressing guide. The elastic member 104 generally refers to a member that provides both the effect of elastically transferring power or movements and the effect of damping, for example, a sponge.

As shown in FIG. 1, since the elastic member 104 is arranged around the pressing rod of the pressing guide 102, the pressing rod of the pressing guide 102 is shielded by the elastic member 104 in FIG. 1. The elastic member 104 is generally located between the pressing plate of the pressing guide 102 and the main frame 103. As an example, two ends of the elastic member 104 may be fixedly connected to the pressing plate of the pressing guide 102 and the main frame 103, respectively, and for example, may be fixed by means of glue or laser welding.

The vibration motor is generally arranged in the vibration motor mount 101, and can be adhered to the vibration motor mount 101 by means of glue. The vibration motor mount 101 is fixedly connected to a first surface of the pressing plate of the pressing guide 102. The vibration motor mount 101 can be adhered to the pressing plate of the pressing guide 102 by means of a double-sided adhesive tape.

A second surface of the pressing plate of the pressing guide 102 generally abuts against a first end of the pressing rod, and a second end of the pressing rod passes through the through hole 1031 and is movably connected to the main frame 103. The movable connection refers to a connection in which the relative movement of a connected component remains be allowed. Here, the relative movement of the second end of the pressing rod to the main frame 103 can remain possible.

Here, when the vibration motor vibrates, the elastic member 104 is pressed. During pressing, the second end of the pressing rod would pass through the through hole 1031, and when the elastic member 104 is restored to its original shape, the second end of the pressing rod may pass through the through hole 1031 or may not pass through the through hole 1031, which depends on a length of the pressing rod.

During the vibration of the vibration motor in the vibration motor mount 101 that causes the pressing guide 102 to vibrate up and down, energy generated by the vibration of the vibration motor is absorbed by the elastic member 104, and thus less energy is transferred to the main frame 103. The vibration unit of this solution can be employed to reduce the resulting shaking of a screen of the head-mounted display device while allowing the user to have an increased immersive head haptic sensation.

Figure 2:
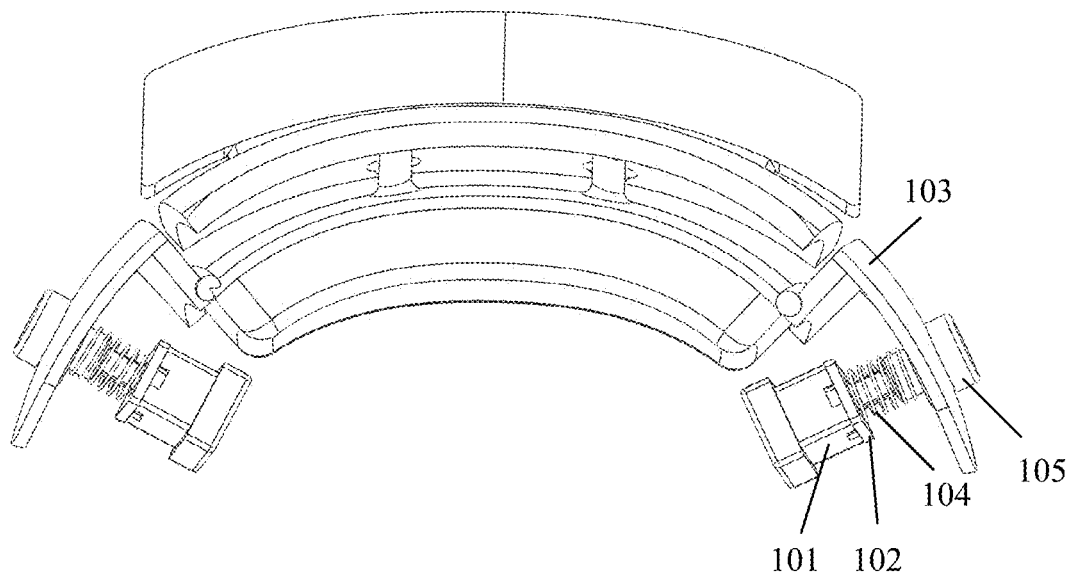
FIG. 2 is a schematic structural diagram of another embodiment of a vibration unit according to the present application.

FIG. 2 shows a schematic structural diagram of another embodiment of a vibration unit according to the present application. As shown in FIG. 2, the vibration isolating unit may further include a limiting block 105. The limiting block 105 may also be referred to as an outer stop or a fixed block for preventing the elastic member 104, the pressing guide 102, the vibration motor and the vibration motor mount 101 from falling off from the main frame 103.

Here, the elastic member 104 may be a spring. In this case, the spring may abut against the main frame 103 at a first end, and abut against the pressing plate of the pressing guide 102 at a second end.

The second end of the pressing rod of the pressing guide 102 may successively pass through the spring 104 and through hole 1031, and a tip of the second end of the pressing rod may be fixedly connected to the limiting block 105.

During the vibration of the vibration motor in the vibration motor mount 101 that causes the limiting block 105 and the pressing guide 102 to vibrate up and down, energy generated by the vibration of the vibration motor is absorbed by the spring 104, and thus less energy is transferred to the main frame 103. In this solution, the limiting block is used for preventing the elastic member, the pressing guide, the vibration motor and the vibration motor mount from falling off from the main frame. In addition, the effect of vibration isolation is enhanced by using the spring as the elastic member.

In some optional implementations, an insertion hole of the limiting block 105 may be an elongated hole, thereby preventing the pressing rod of the pressing guide 102 from rotating, and securing the pressing guide 102 to the limiting block 105. It should be noted that the pressing rod of the pressing guide 102 is not generally a circular rod. For example, the pressing rod may a D-shaped pressing rod.

Figure 3:
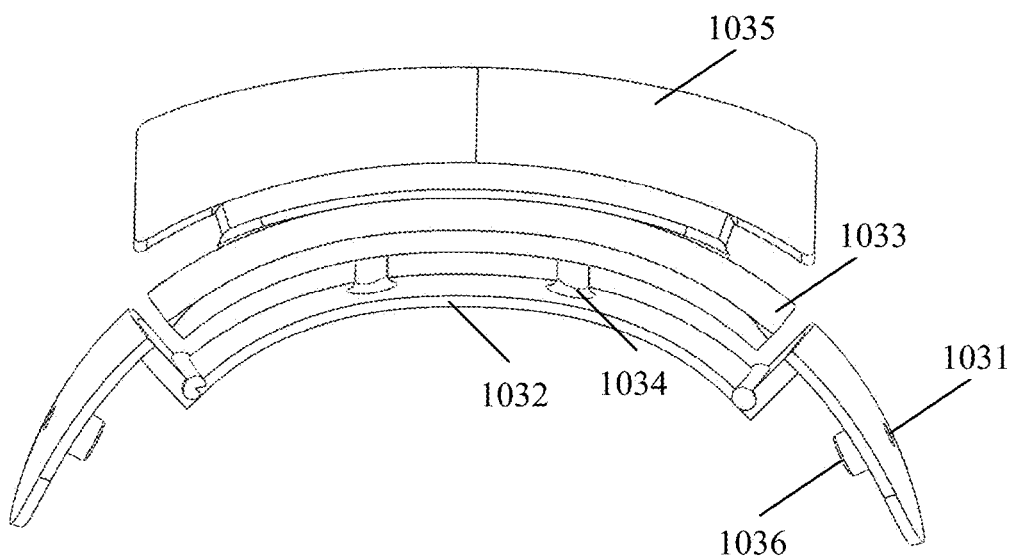
FIG. 3 is a schematic structural diagram of an embodiment of a main frame of a vibration unit according to the present application.

FIG. 3 shows a schematic structural diagram of an embodiment of a main frame of a vibration unit according to the present application. As shown in FIG. 3, the main frame 103 may include a first sub-frame 1032 and a second sub-frame 1033. The first sub-frame 1032 may be connected to the second sub-frame 1033 by means of a connecting post 1034. The first sub-frame 1032 is configured to be in contact with human skin, and the second sub-frame 1033 generally includes a connecting base 1035. The connecting base 1035 is configured to connect the vibration unit and the head-mounted display device. The main frame of such a structure is divided into an inner layer and an outer layer, and the transferred energy is filtered again through the connecting post, so that the residual vibration eventually transferred to the head-mounted display device is not sufficient to affect the screen of the head-mounted display device.

Figure 4:
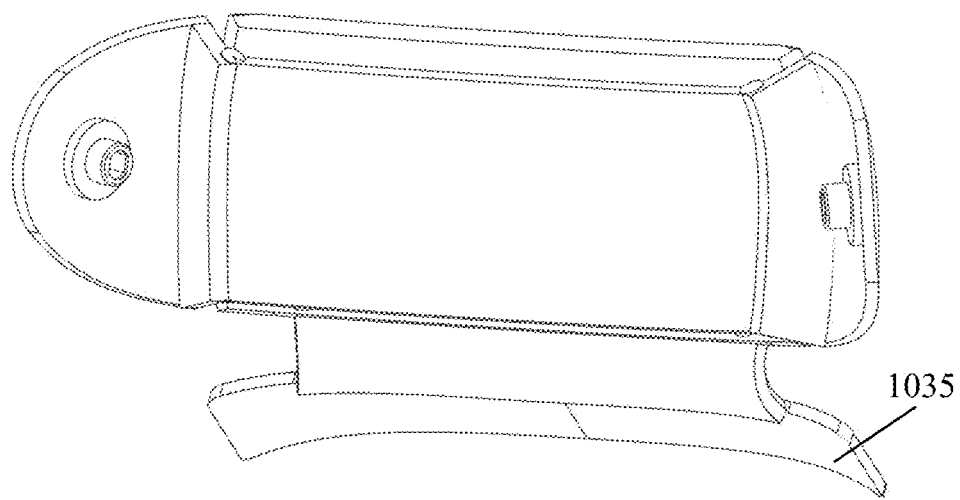
FIG. 4 is a schematic structural diagram of another embodiment of a main frame of a vibration unit according to the present application.

FIG. 4 shows a schematic structural diagram of another embodiment of a main frame of a vibration unit according to the present application. As shown in FIG. 4, the vibration unit is connected to the head-mounted display device by means of a connecting base 1035. The connecting base 1035 can be adhered to the head-mounted display device by means of a double-sided adhesive tape.

In some optional implementations, soft silicone or rubber is provided at an end of the first sub-frame 1032 that is in contact with the human skin. In this way, the part of the vibration unit is in contact with the user can be softer, thereby improving the user experience.

In some optional implementations, a guide projection, as denoted by a reference numeral 1036 in FIG. 3, is provided at either end of the main frame. The guide projection 1036 is generally coaxial with the through hole 1031, and the guide projection 1036 is configured to guide a vibration direction of the spring 104, so as to prevent a deviation of the vibration direction of the spring.

In some optional implementations, soft silicone or rubber is provided at an end of the vibration motor mount 101 that is in contact with the skin. In this way, the part of the vibration isolating unit that is in contact with the user can be softer, thereby improving the user experience.

Here, the vibration motor can be connected to the vibration motor mount 101 by means of a double-sided adhesive tape. The connection by the double-sided adhesive tape makes it possible to remove the vibration motor from the vibration motor mount at any time. The vibration unit can be made of a photosensitive resin. The photosensitive resin refers to a photocureable material used for quick forming, which is a liquid photocureable resin or referred to as a liquid photosensitive resin, and mainly composed of an oligomer, a photoinitiator and a diluent. In recent years, the photosensitive resin is being used in an emerging industry of 3D printing, and is favored and valued by the industry for its excellent properties. The photosensitive resin generally has a high finish, high strength, high temperature resistance, water resistance and other characteristics.

Figure 5:
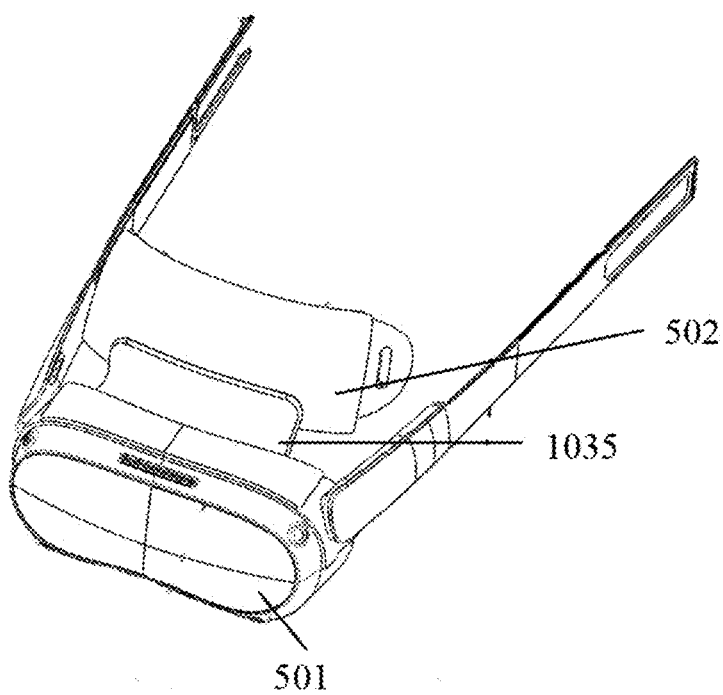
FIG. 5 is a schematic structural diagram of an embodiment of a head-mounted display device according to the present application.

FIG. 5 shows a schematic structural diagram of an embodiment of a head-mounted display device according to the present application. As shown in FIG. 5, the head-mounted display device may include a head-mounted display device body 501 and a vibration unit 502 as described in the embodiments of the present application. The head-mounted display device body 501 is connected to a connecting base 1035 of the vibration unit 502. For example, the head-mounted display device body 501 can be adhered to the connecting base 1035 of the vibration unit 502 by means of glue.

This component, i.e., the vibration unit, is added in the head-mounted display device, such that during the vibration of the vibration motor in the vibration motor mount which causes the pressing guide to vibrate up and down, energy generated by the vibration of the vibration motor is absorbed by the elastic member, and thus less energy is transferred to the main frame, and the transferred energy is filtered again by the main frame by means of the connecting post, such that the residual vibration eventually transferred to the head-mounted display device is not sufficient to affect the screen of the head-mounted display device. The head-mounted display device of this solution can be employed to reduce the resulting shaking of the screen of the head-mounted display device while allowing the user to have an increased immersive head haptic sensation.

Here, the head-mounted display device body 501 can be connected to the connecting base 1035 of the vibration unit 502 by means of a double-sided adhesive tape. The connection by the double-sided adhesive tape makes it possible to remove the vibration unit from the head-mounted display device body at any time.

In some optional implementations, the head-mounted display device body 501 can control the vibration motor of the vibration unit 502 to vibrate, and the vibration is isolated and buffered by the various components of the vibration unit 502, such that the residual vibration eventually transferred to the head-mounted display device is not sufficient to affect the screen of the head-mounted display device, thereby reducing the resulting shaking of the screen of the head-mounted display device while allowing the user to have an increased immersive head haptic sensation.

It should be noted that the head-mounted display device body can output a corresponding vibration signal according to a screen scenario of the display device, such that the vibration signal varies as the screen scenario to provide the user with both visual and haptic experiences.

Figure 6:
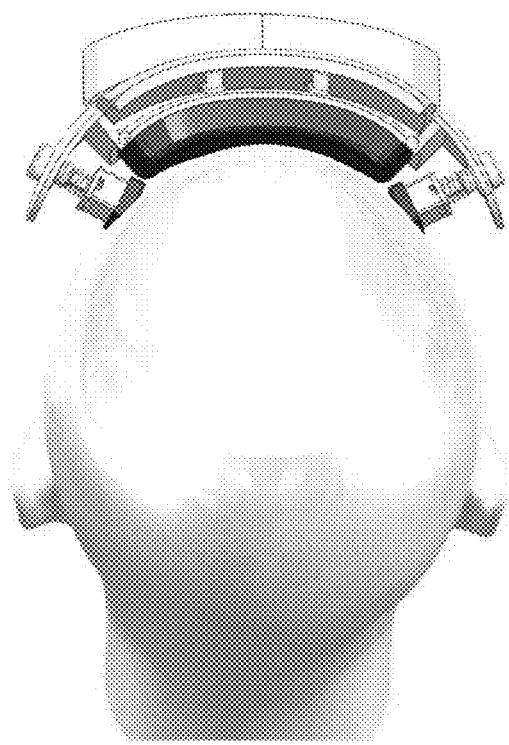
FIG. 6 is a schematic diagram of an embodiment of an application scenario for a head-mounted display device according to the present application.

FIG. 6 shows a schematic diagram of an embodiment of an application scenario for a head-mounted display device according to the present application. As shown in FIG. 6, a user wears a head-mounted display device including a vibration unit, and the user can have a haptic experience while viewing a screen of the head-mounted display device. The use of the vibration unit reduces the resulting shaking of the screen of the head-mounted display device while allowing the user to feel the vibration on the head.

The foregoing descriptions are merely preferred embodiments of the present disclosure and explanations of the applied technical principles. Those skilled in the art should understand that the scope of the present invention involved in the embodiments of the present disclosure is not limited to the technical solutions formed by particular combinations of the foregoing technical features, and shall also cover other technical solutions formed by any combination of the foregoing technical features or equivalent features thereof without departing from the foregoing concept of the present invention. For example, a technical solution formed by a replacement of the foregoing features with technical features with similar functions disclosed in the embodiments of the present disclosure (but not limited thereto) also falls within the scope of the present disclosure.

The invention claimed is:

1. A vibration unit for a head-mounted display device, comprising: a vibration motor, a vibration motor mount, a pressing guide, a main frame, and an elastic member, the pressing guide comprising a pressing rod and a pressing plate, and a through hole being provided in either end of the main frame, wherein
   the vibration motor is arranged in the vibration motor mount fixedly connected to a first surface of the pressing plate of the pressing guide;
   a second surface of the pressing plate abuts against a first end of the pressing rod, and a second end of the pressing rod passes through the through hole, and is moveably connected to the main frame;
   the elastic member is arranged around the pressing rod and is located between the pressing plate of the pressing guide and the main frame; and
   the main frame comprises a connecting base configured to be connected to the head-mounted display device.

2. The vibration unit according to claim 1, wherein the vibration unit further comprises a limiting block, wherein
   the elastic member is a spring; and
   the second end of the pressing rod of the pressing guide successively passes through the spring and the through hole, and a tip of the second end of the pressing rod is fixedly connected to the limiting block.

3. The vibration unit according to claim 2, wherein an insertion hole of the limiting block is an elongated hole.

4. The vibration unit according to claim 1, wherein the main frame comprises a first sub-frame and a second sub-frame that are connected to each other by means of a connecting post, the first sub-frame being configured to be in contact with the human body, and the second sub-frame comprising the connecting base.

5. The vibration unit according to claim 4, wherein soft silicone or rubber is provided at an end of the first sub-frame that is in contact with the human body.

6. The vibration unit according to claim 1, wherein a guide projection is provided at each of two ends of the main frame and is coaxial with the through hole.

7. The vibration unit according to claim 1, wherein soft silicone or rubber is provided at an end of the vibration motor mount that is in contact with the skin.

8. A head-mounted display device, comprising: a head-mounted display device body and a vibration unit according to claim 1; wherein
the head-mounted display device body is connected to the connecting base of the vibration unit.

9. The head-mounted display device according to claim 8, wherein the head-mounted display device body controls the vibration motor of the vibration unit to vibrate.

* * * * *